United States Patent [19]

Lyjak et al.

[11] Patent Number: 4,765,286
[45] Date of Patent: Aug. 23, 1988

[54] SELECTIVELY TUNED INTAKE MANIFOLD

[75] Inventors: Jeffrey C. Lyjak, Ferndale; William Maciejka, Sterling Heights, both of Mich.

[73] Assignee: Chrysler Motors Corporation, Highland Park, Mich.

[21] Appl. No.: 919,515

[22] Filed: Oct. 16, 1986

[51] Int. Cl.⁴ ............................................. F02B 75/06
[52] U.S. Cl. ........................ 123/52 MB; 123/52 MC
[58] Field of Search .......... 123/52 M, 52 MC, 52 MB

[56] References Cited

U.S. PATENT DOCUMENTS 4,619,226  10/1986  Ueda et al. .................... 123/52 MB
4,646,689   3/1987  Katsumoto et al. ........... 123/52 MB

FOREIGN PATENT DOCUMENTS 2031999  4/1980  United Kingdom .......... 123/52 MB

Primary Examiner—Craig R. Feinberg
Assistant Examiner—David A. Okonsky
Attorney, Agent, or Firm—Kenneth H. MacLean, Jr.

[57] ABSTRACT

An intake manifold for an internal combustion engine having a selectively controlled variable length flow path whereby the manifold may be resonantly tuned for optimum performance over a wide engine speed range.

1 Claim, 3 Drawing Sheets

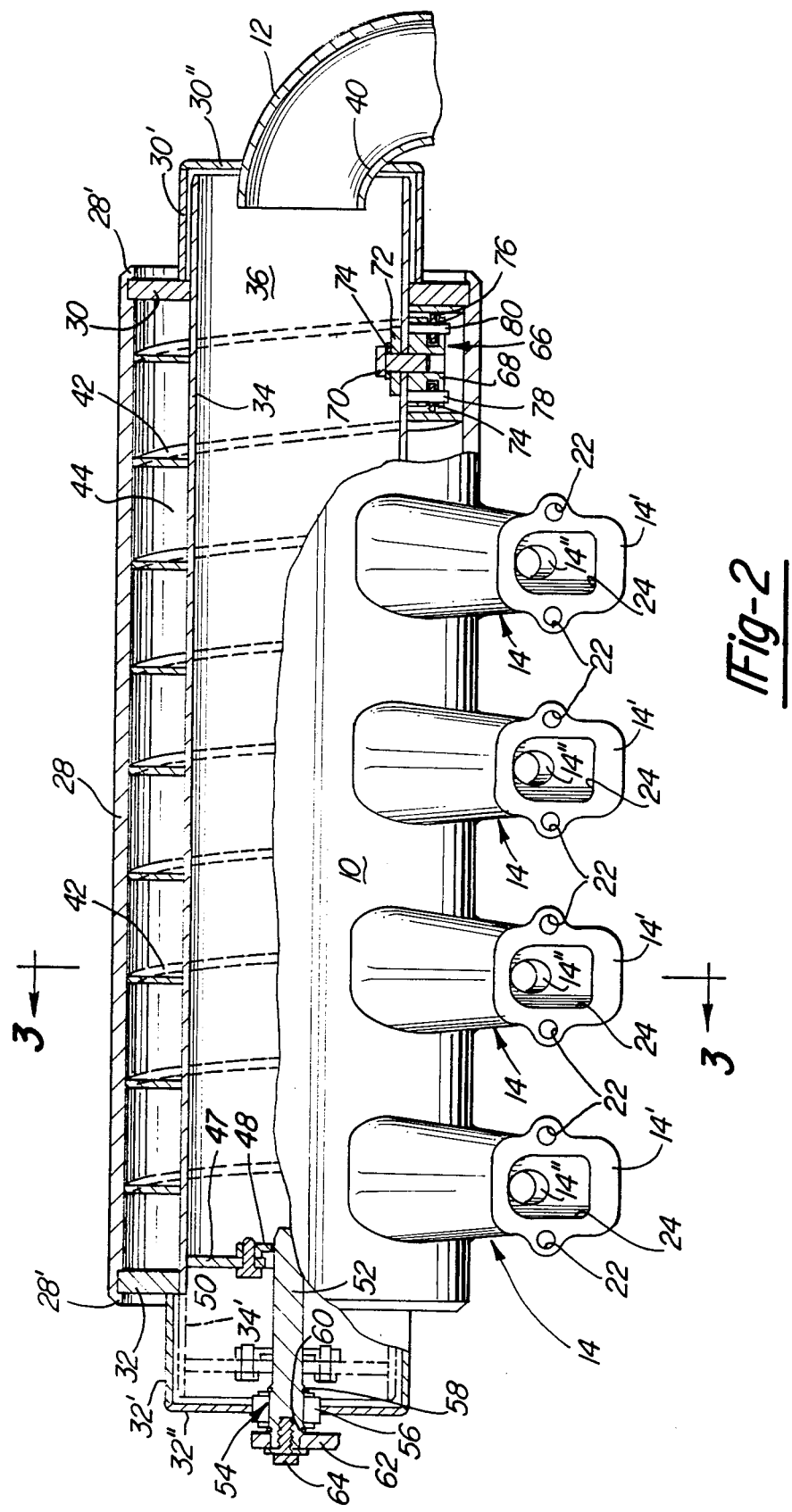

SELECTIVELY TUNED INTAKE MANIFOLD

BACKGROUND OF THE INVENTION

The desirability of providing an intake manifold for an internal combustion engine having a variable flow length has been recognized previously. Selection of a specific flow length for the intake manifold generates a specific resonant frequency at a specific engine speed. For this specific engine speed, the volumetric efficiency or flow is maximized, In the past, relatively long ram tube type manifolds have developed which are very effective at a given engine speed, but which may only provide advantageous operation over a relatively narrow speed range. Accordingly, it is desirable to provide a manifold with a selectively variable flow length.

Under relatively low engine speed operating conditions, the frequency of the engine inlet valve opening cycle is relatively low. Thus, the frequency or pulsations of the air column within the manifold is also low and the time between pulsations is relatively long. Accordingly, under low speed engine operation, a relatively long manifold flow length is desirable in order to achieve resonance and, hence, a desirable high efficiency engine breathing. However, under relatively high engine speed operating conditions, the frequency of the engine inlet valve opening cycle is relatively high and, also, the frequency of air column pulsations. Under these conditions, the time between such pulsations is rather short. Thus, a relatively short air flow length is desirable to achieve a resonant condition and resultant high efficiency breathing for the engine.

The U.S. Pat. No. 3,370,575 discloses a dual flow path manifold for an engine. Controls are provided to alternately shift the flow from one flow path to a second flow path.

U.S. Pat. No. 1,598,046 discloses a manifold for an internal combustion engine provides two alternate flow paths, each having a separate carburetor.

U.S. Pat. No. 2,894,497 discloses a manifold with an effective variable length air passage controlled by an engine governor device. The variable length portions of the device include telescoped metal tubes with portions of the surface removed so that, as the tubes are rotated relative to one another, the effective air flow is varied.

U.S. Pat. No. 4,543,918 discloses an intake manifold with a plurality of tubular air flow sections within a plenum arranged serially so that the sections may be combined end to end with without flow gaps therebetween, thus effectively providing a desired tuned air flow.

SUMMARY OF THE INVENTION

None of the aforedescribed patents disclose a simple, compact and highly effective intake manifold for an internal combustion engine with a variable length air flow path which is selectable for an appropriate engine speed. The subject intake manifold effectively varies the air flow path over a wide engine speed to promote effective and efficient engine breathing and produce a high torque efficient engine.

The subject manifold utilizes a tubular air distribution member which is movable axially within an elongated housing. The intake manifold housing has a helically configured partition or wall means within and surrounding the tubular air distribution members. Air for the engine flows from the interior of the tubular member through outlets or windows therethrough and then is directed by the helical partition wall about the exterior surface of the tubular air distributor to housing outlets extending to the engine combustion chambers. The air distribution member is moved axially and is rotated within the manifold in accord with the helical partition wall. This moves the windows of the distribution member along the helical air flow path. Thus, the air flow channels from the windows to the housing outlets can be made longer or shorter, thus effectively tuning the air flow path for engine speed.

The relatively simple structure of the subject intake manifold is an important feature of the device. Another important advantageous feature is the compact nature of the device resulting from its use of a concentric air distribution channel within an elongated manifold. This structure is particularly easily located relative to an engine. Further, the relatively simple functional method consisting of rotating the air distribution member within the manifold to provide a varied air flow length is very desirable. Other desirable features and advantages of the manifold are readily understood from a reading of the following detailed description of a preferred embodiment, reference being to the drawings in which a preferred embodiment is illustrated.

IN THE DRAWINGS

FIG. 2 is also an elevational and partially sectional view of the subject intake manifold;

DETAILED DESCRIPTION OF THE EMBODIMENT

Figure 3:
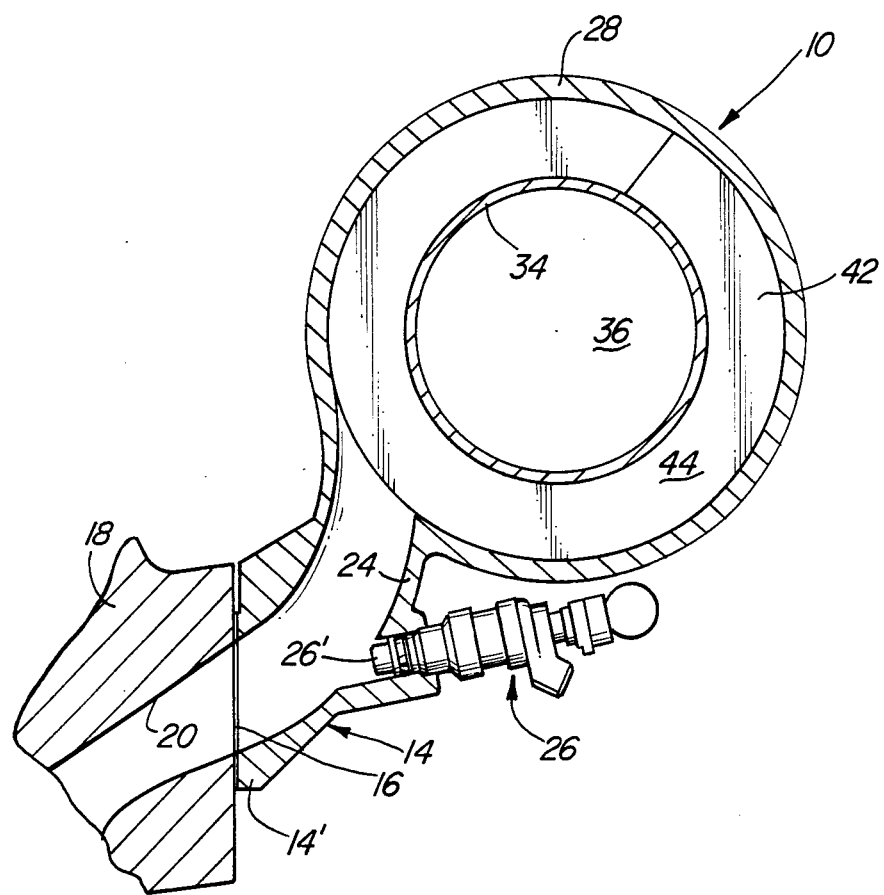
FIG. 3 is a sectioned view of the intake manifold looking in the direction of section lines 3—3 in FIG. 2 and also including a portion of the engine cylinder head which supports the manifold.

In the figures, an intake manifold 10 is shown which includes an air inlet conduit 12 fluidly arranged to deliver a fluid, such as air, to the intake manifold through one end of the manifold. The manifold 10 also includes a plurality of air outlet conduits 14 for delivery to one of the engine cylinders. Specifically, the outlet conduits 14 include flanged end portions 14' adapted to rest against a surface 16 of an engine cylinder head 18 as best shown in FIG. 3. The cylinder head 18 shown in FIG. 3 reveals one of the intake flow passages 20 as provided for each engine cylinder chamber (not shown). The end portion 14' are adapted to be connected to the cylinder head 18 by fasteners (not shown) which extend through bolt holes 22 in the ends 14' of the outlet conduits. Air flows through a passage 24 in outlet conduit 14 and fuel is introduced by means of an electrically actuated fuel injection device 26 which is commonly used on modern automobiles. Specifically, the injection device 26 includes an outlet end 26' within a bore 14". The end 26' of injector 26 directs a pulsed spray of fuel to passage 24 at a desired frequency corresponding to engine speed, engine load, and other variables of engine operation.

Figure 1:
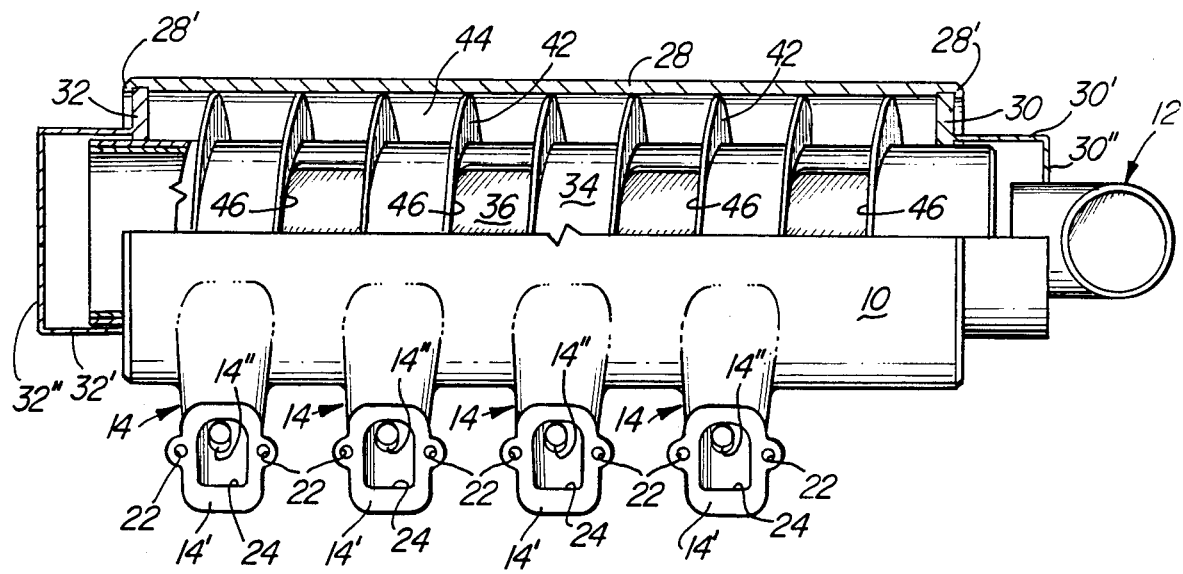
FIG. 1 is an elevational and partially sectioned view of the subject intake manifold.

Intake manifold 10 has a generally tubular and elongated main housing 28. The housing 28 may be either in the form of a fabricated structure (FIGS. 1-3) or a cast structure as in FIG. 4. The rightward end of the housing 28 in FIGS. 1-3 is covered by an end member 30.

The leftward end of the housing 28 is likewise covered by a member 32. Rolled over end portions 28' of housing 28 secure members 30, 32. A tubular air distribution member 34 coaxially extends within the elongated housing 28 and is slidingly supported at the right end by member 30 and at the left end by member 32. The distribution member 34 is supported to move both axially within the housing 28 and rotationally.

The end cover members 30 and 32 include axially extending tubular portions 30', 32' and end plates 30", 32". The air inlet conduit 12 extends through the end plate 30" to an interior 36 of the distributor member 34.

A partition wall member 42 is arranged in a helical pattern within housing 28 and about the air distributor 34. Member 42 spirals between the end members 30, 32. Partition member 42 is attached at its radially outer edge to the housing 28 and is slideably fitted at its inner edge about the outer surface of the distributor member 34. This permits the member 34 to move within the housing 28 relative to wall member 42. Resultantly, a spirally extending air channel or passage 44 is formed about the tubular air distributor 34. The outlet passages 24 associated with the outlet conduits 14 intersect these air flow channels 44 at spaced locations along the axial length of the housing 28.

As best shown in FIG. 1, the distribution member 34 is provided with cutouts or windows 46 to connect the interior 36 of member 34 and, thus, the inlet conduit 12 with the air flow channel 44 and with each outlet passage 24. The windows 46 are positioned through the distribution member 34 so that when the member 34 is located in the solid line position in FIG. 2, each window is spaced the greatest axial distance from the associated outlet passage 34. Consequently, the distribution member 34 produces an air flow from inlet conduit 12 through the windows and around the member 34 through a relatively long length air flow channel 44 before reaching outlet passage 24. Conversely, when the air distribution member 34 moves to the left in FIG. 1 to the dotted line position 34', the windows 46 also move closer to the outlet passages 24. Resultantly, the air flows through a shorter path than previously described.

The aforedescribed distribution member 34 is not only moved axially within the housing 28, but also rotates so that the windows 46 move within the respective flow channels defined between the spaced helically extending partition wall 42. To generate the aforedescribed dual movement, an interior end member 47 is attached adjacent the leftward end of the distribution member 34 as shown in FIG. 2. An apertured and threaded driven member 48 is attached to member 46 by bolt fasteners 50. Extending through the threaded driven member 48 is a similarly threaded portion 52 of a driving member 54. Member 54 is supported within a bearing 56 mounted in the leftward end plate 32". A pair of retainer rings 58 and 60 axially maintain the threaded drive member 54 as it is rotated. A drive mechanism 62 is attached to the outwardly extending end portion of member 54 by a fastener 64. By this means, the member drive 54 is rotated to cause the threaded portion 52 thereof to threadably engage the member 48 and to exert a force on the distribution member 34 toward the left in FIG. 2. Although the same mechanism to move distribution members 34 is required in FIGS. 1, 3, and 4 for simplicity, the mechanism is detailed only in FIG. 2.

Responsive to the aforesaid axial force on the member 34 as described in the previous paragraph, member 34 is forced to the left and to rotate by the action of a follower mechanism 66 which is attached to member 34. Specifically, the follower mechanism 66 has a support body 68 attached to the wall of the tubular member 34 by a bolt fastener 70. A back-up member 72 and a washer 74 are also used. The body 68 supports a pair of roller bearings 74 and 76 to engage spaced opposite portions of the partition wall 42. The bearing wheels are supported by and rotate about axis pin means 78 and 80. As the threaded drive member 52 is rotated, an axially directed force is exerted on the member 34. The bearings 74 and 76 permit the distribution member 34 to move axially in the housing 28 only when accompanied by relative directed by the bearing member 74 and 76 following the partition wall 42. Thus, the distribution member 34 is simultaneously moved both axially and rotatively to always locate the windows 48 therethrough to direct air flow into the air flow channel 44 between spaced wall portions.

Now, it can be readily understood that when the air distribution member 34 moves axially and rotatively, the flow path is lengthened or shortened. The air distribution member 34 is ideally placed in the solid line position shown in FIG. 2 when the engine is running at idle or slow speed, thus producing a long flow path. As engine speed increases, the member 34 moves axially to the left and rotates clockwise in FIG. 3, thereby locating the windows along the flow channel 44 closer to the fluid connection with the respective outlet channels 24. This shortens the air flow between the inlet 12 and the outlet 24 for higher engine torque. When the member 34 is in the dotted line position to the left in FIG. 2, the flow path is at a minimum length and tuned for high speed torque engine operation.

Figure 4:
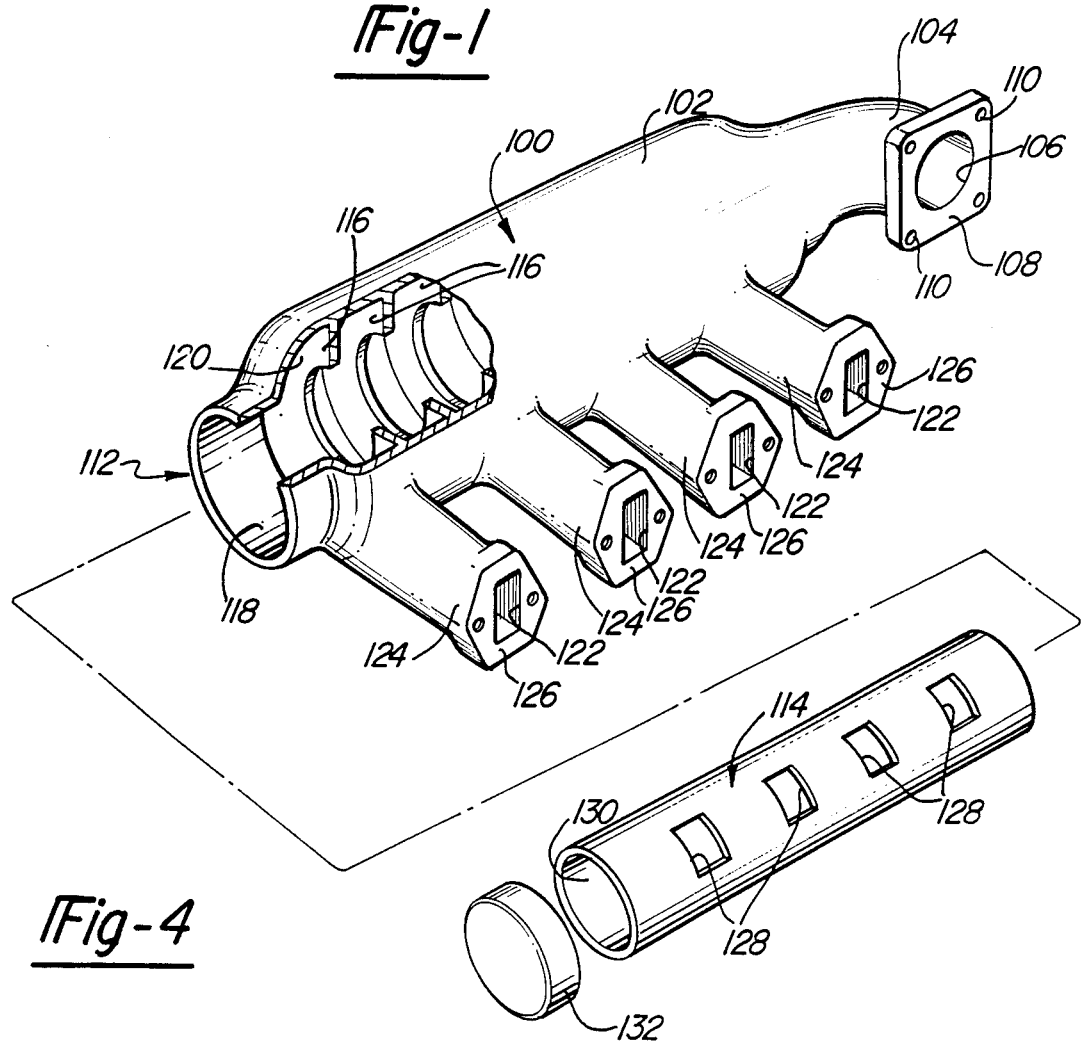
FIG. 4 is a perspective assembly view of the various parts of a slightly modified embodiment of the intake manifold.

The embodiment shown in FIG. 4 is a modification of the embodiment of FIGS. 1–3. The manifold 100 is again an elongated structure, but instead of being fabricated (welded together), it uses a cast housing 102 with an integral inlet end 104 defining an inlet passage 106 for air. The entrance to passage 106 is surrounded by a mounting flange 108 with bolt receiving holes 110 therethrough.

The housing 102 has an open end 112 opposite inlet end 104. The open end receives a tubular air distribution member 114. Member 114 is slideably supported with housing 102 by a helically extending partition wall 116 cast integral with housing 102. The leftward end of the member 114 is sealingly surrounded by cylindrical wall means 118. When the member 114 is supported within housing 102 for axial and rotative movement as like member 34 in the other embodiment, a continuous air path 120 is formed between members 102 and 114 and between spaced surfaces of partition wall 116. The air flow path or channel 120 connects with air outlet passages 122, one of which extends to each cylinder of an associated engine. The outlet passages 122 are formed within outlet conduits or branches 124 cast integrally with the housing 102. Flanges 126 on the end of branches 124 are apertured to receive fasteners (not shown).

The distribution member 114 includes windows 128 from its interior 130 for flowing air from inlet 106 through channel 120 and to outlet 122. Member 114 is moved both axially and rotatively in housing 102 as does member 34 of the other embodiment. These windows 128 also move along channel 120 to lengthen or shorten the air flow path.

The open end 112 of housing 102 is covered by an end plate 132. The member 132 also carries a drive mechanism similar to mechanism 34 in the other embodiment, but is not shown. Likewise, member 114 carries a driven mechanism similar to mechanism 48 in the other embodiment, but is not shown.

While only two possible constructions of the intake manifold are illustrated and described in detail, other modifications are contemplated which still fall within the scope of the following claims.

We claim:

1. An intake manifold for an internal combustion engine having selectively variable length air flow passages, comprising: a hollow elongated housing about an interior space, the housing member having a side wall and end portions; means extending through the housing end portion to introduce air to the interior space; an air outlet extending from the side wall toward each cylinder of an associated internal combustion engine and being fluidly connected to the interior space; a tubular air distribution member supported for axial and rotative movement in the interior space of the housing and defining therein an interior passage, the distribution member having an open end positioned to pass air from the air inlet means and into the interior passage of the distribution member; a helically extending partition wall attached at an outer edge to the housing and encircling the air distribution member in close fitting fashion to allow relative axial and rotative movement of the distribution member, thus forming a spiral flow passage between the housing member and the outer surface of the air distribution member; window means spaced axially along and extending through the distribution member to allow air to flow from the interior passage to the spiral flow passage; means for selectively shifting the air distribution member both in an axial direction and in a rotative direction thereby positioning the window means along the spiral passage to change the air flow length between the window means and the air outlet means, the means including a drive to exert axially directed forces on the air distribution member and further including a partition wall follower mechanism to convert the axial force on the distribution member into axial and rotative movement thereof; the shifting means including a threaded connection between the air distribution member and a rotatable member supported by the housing in a manner to allow rotation of the rotatable member but not axial movement thereof; the follower mechanism including a body attached to the outer wall of the air distribution member and located in the spiral flow passage formed between spaced portions of the helically extending partition wall, first and second roller means supported for rotation by the body so that the first roller means contacts one of the partition wall portions and a second roller means contacts the other of the partition wall portions whereby low friction rolling action there between causes both axial and rotative movement of the air distribution member in the housing in response to an axial force exerted thereon.

* * * * *